(12) United States Patent
Salvador et al.

(10) Patent No.: US 8,091,039 B2
(45) Date of Patent: Jan. 3, 2012

(54) AUTHORING INTERFACE WHICH DISTRIBUTES COMPOSITED ELEMENTS ABOUT THE DISPLAY

(75) Inventors: Richard Salvador, Santa Monica, CA (US); Nathalie Castel, Los Angeles, CA (US); Charles J. Migos, San Francisco, CA (US); Philippe Panzini, Dakar (SN)

(73) Assignee: Apple Inc., Cupertino, CA (US)

( * ) Notice: Subject to any disclaimer, the term of this patent is extended or adjusted under 35 U.S.C. 154(b) by 860 days.

(21) Appl. No.: 11/786,872

(22) Filed: Apr. 13, 2007

(65) Prior Publication Data

US 2008/0256466 A1 Oct. 16, 2008

(51) Int. Cl.
*G06F 3/17* (2006.01)
*G06F 3/14* (2006.01)
*G06F 17/00* (2006.01)

(52) U.S. Cl. ........ 715/790; 715/251; 715/719; 345/205; 345/641; 345/660

(58) Field of Classification Search .......... 715/200–277, 715/790, 766, 767, 855; 700/701–799, 800–866; 709/201–229; 705/50–79; 345/30–111, 345/205, 641, 660, 716, 719, 721, 619; 378/5; 235/487

See application file for complete search history.

(56) References Cited

U.S. PATENT DOCUMENTS

| | | | |
|---|---|---|---|
| 5,553,211 A * | 9/1996 | Uotani | 345/641 |
| 6,069,606 A * | 5/2000 | Sciammarella et al. | 345/660 |
| 6,144,375 A * | 11/2000 | Jain et al. | 715/251 |
| 6,366,296 B1 * | 4/2002 | Boreczky et al. | 715/719 |
| 6,402,037 B1 * | 6/2002 | Prasad et al. | 235/487 |
| 6,570,582 B1 * | 5/2003 | Sciammarella et al. | 345/660 |
| 6,801,230 B2 * | 10/2004 | Driskell | 715/854 |
| 6,915,489 B2 * | 7/2005 | Gargi | 715/790 |
| 2004/0261037 A1 | 12/2004 | Ording et al. | |
| 2004/0261038 A1 | 12/2004 | Ording et al. | |
| 2005/0253867 A1 * | 11/2005 | Inakura | 345/600 |
| 2007/0002077 A1 * | 1/2007 | Gopalakrishnan | 345/619 |
| 2007/0133736 A1 * | 6/2007 | Chen et al. | 378/5 |
| 2008/0168387 A1 * | 7/2008 | Brownrigg et al. | 715/799 |
| 2008/0211686 A1 * | 9/2008 | Arai | 340/815.4 |
| 2008/0246748 A1 * | 10/2008 | Cassidy et al. | 345/205 |

* cited by examiner

*Primary Examiner* — Ruay Ho
(74) *Attorney, Agent, or Firm* — Hickman Palermo Truong & Becker LLP

(57) ABSTRACT

Techniques are described for providing a display of visual elements representing various media elements on a composite media presentation, wherein the display may be altered such that the visual elements transition from an overlapping arrangement to an arrangement where the overlap is minimized or eliminated. Once in the non-overlapping arrangement, a particular element may be selected or manipulated, for example applying an effect to the underlying media element, and the display returns to the original overlapping arrangement of visual elements, in some embodiments ending with the selected visual element at the top of the overlapping arrangement where before the visual elements may have been partially or completely obstructed from view.

48 Claims, 16 Drawing Sheets

AUTHORING INTERFACE WHICH DISTRIBUTES COMPOSITED ELEMENTS ABOUT THE DISPLAY

RELATED APPLICATION DATA

This application is related to U.S. application Ser. No. 10/465,855, entitled "Computer Interface Having a Virtual Single-Layer Mode for Viewing Overlapping Objects," filed Jun. 20, 2003; and U.S. application Ser. No. 10/689,687, entitled "Computer Interface Having a Virtual Single-Layer Mode for Viewing Overlapping Objects," filed Oct. 22, 2003, the entire disclosures of which are incorporated by reference as if fully set forth herein.

FIELD OF THE INVENTION

The present invention relates to visual elements in a display and, more specifically, to an approach for an authoring interface wherein composite visual elements are distributed about a display and manipulated.

BACKGROUND

The increased processing power and graphical capabilities of modern computer systems have ushered in a new age of video production. Current video production software allows video professionals to create incredibly complex presentations such as animations encompassing multiple layers of elements, such as titles, video, backgrounds and other elements. Each layer may also have additional elements associated with it, such as music, sound effects, different animations for individual elements, and actions associated with elements, such as defining a response to an element being activated by a user; for example, having a graphic element animate in response to a mouse click.

All of these layers and elements combine to form a finished visual product; however, during authoring of the finished product, each layer and element needs to be manipulated in order to achieve the desired result. For example, a video title animation for a DVD may be comprised of several discrete portions arrayed along a timeline, and each portion may be comprised of numerous elements. For example, at one point in a timeline of the animation, the displayed frame may be made up of a background picture, multiple text titles, and a video. Later in the timeline, a displayed frame may be made up of an entirely different set of images, text and videos. An entire project may be made up of tens, hundreds, or even thousands of objects to manage, such as layers, text, filters, video, animations, and effects.

A current approach to managing these objects is to display each object in a linear list that is navigated with scroll bars and similar user interface elements. A user would click on a particular element in the list to "activate" that element for editing or other manipulations. A user may also click on an element in the display and the corresponding entry in the list would be selected.

A drawback to the current approach is that in a project comprising hundreds of elements, navigation of a list becomes tedious and confusing. An element that the user wishes to select in the list may not even be displayed on the screen; for example, an element may not appear in the presentation until the thirty second mark, but the currently-displayed frame is at the ten minute mark. If a user selects the desired element from the list, then there is no corresponding element on the display.

Another current approach to managing objects is the concept of "layers," which are a hierarchical structure that allows for ordering and placement of various objects on different "levels" of the display in order to better organize related and discrete objects. A current approach to the management of layers is to organize them in a similar linear list, and upon selection of a particular layer in the list, changing the display to only display that particular layer. Multiple layers may be selected for display, and layers may be merged into each other.

A drawback to the current approach of managing layers and their respective elements is that a linear list of layers is not conducive to efficient management and manipulation of the layers and their respective elements. A user may find herself selecting and deselecting various layers regularly in order to manipulate certain elements, and certain layers may have been merged in a manner that does not allow for individual manipulation of particular elements, so the user must first un-merge the layers to make changes, then re-merge the layers in order to generate a desired display.

Another drawback to current approaches of distributing elements on a display is that a user may want to see all elements comprising a project; however, the project may consist of numerous layers and objects in those layers, and the layers and objects may become active at different points along the timeline of the project. Currently, there is no way to alternate viewing the currently-displayed frame and its elements and all elements existing in all frames.

Another drawback to current approaches is that layers are displayed in a flat, two-dimensional manner. As previously discussed, the management of layers is generally provided by organizing the layers in a linear list, and layers are displayed upon selection of the element in the list corresponding to the layer. Current approaches to displaying layers and managing layers do not efficiently and accurately portray the relationship of layers to one another. Layers in a project are arranged on top of one another in a three-dimensional relationship, yet the management of the layers only displays the layers two-dimensionally, which makes selection and management of the layers difficult and tedious.

Therefore, an approach that allows for an authoring interface that distributes composited visual elements for display and manipulation is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
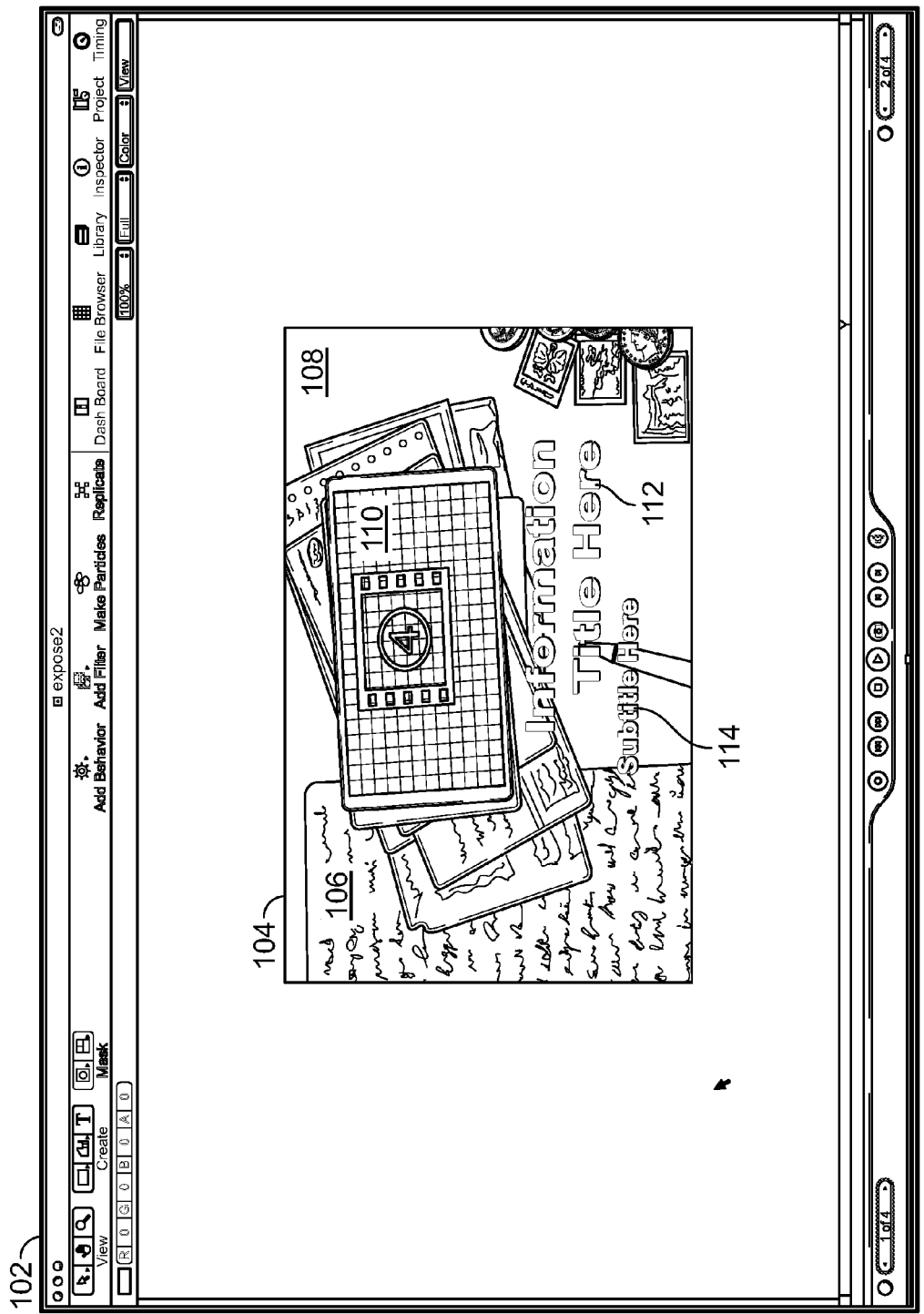
FIG. 1 is a block diagram illustrating an authoring interface wherein composited elements in a project are displayed, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described for providing a display of visual elements representing various media elements on a composite media presentation, wherein the display may be altered such that the visual elements transition from an overlapping arrangement to an arrangement where the overlap is minimized or eliminated. Once in the non-overlapping arrangement, a particular element may be selected or manipulated, for example applying an effect to the underlying media element, and the display returns to the original overlapping arrangement of visual elements, in some embodiments ending with the selected visual element at the top of the overlapping arrangement where before the visual elements may have been partially or completely obstructed from view.

According to an embodiment, the composite media presentation composed of media elements is initially represented by a first arrangement of a first set of visual elements, wherein each visual element in the first set of visual elements corresponds to one or more of the media elements. Then, automatically or in response to input, the display of the first arrangement of the first set of visual elements is transitioned in a visually perceptible manner to a second arrangement of a second set of visual elements from the plurality of visual elements. This second arrangement may comprise a non-overlapping display of the visual elements or a display where the degree of overlap is reduced. The second set may be identical to the first set or may include additional elements, for example every visual element associated with every media element in the composite media presentation. In the second arrangement, a user may select one or more of the displayed visual elements, and in response, a third arrangement of a third set of visual elements is displayed. The third set may be identical to the first set and the selected visual elements appear in a non-overlapping manner; for example, on top of a stack of overlapping visual elements.

According to an embodiment, a current position of a current time indicator on a timeline is determined. The timeline may be associated with the composite media presentation. Based on the current position of the time indicator, a subset of the media elements of the composite media presentation is identified, wherein the subset comprises those media elements that would be displayed in the composite media presentation during the time that is indicated by the current time indicator. A first arrangement of the visual elements corresponding to the subset of media elements is displayed, wherein the visual elements have a stacking "order" and overlap on the display. In response to user input, a second arrangement of the visual elements is displayed in which the degree of overlap of the visual elements is reduced relative to the first arrangement, for example zero. While the visual elements are in the second arrangement, user input is received that selects a particular visual element, and in response to the selection of the particular visual element, a third overlapping arrangement of the set of visual elements is displayed wherein the particular visual element is less obstructed than in the first arrangement.

According to an embodiment, a composite media presentation is initially represented by a first arrangement of a first set of visual elements, wherein each visual element in the first set of visual elements corresponds to a media element of a plurality of media elements that together compose the composite media presentation. In this arrangement, at least one visual element at least partially overlaps another visual element. User input is received that selects an effect that can only be applied to a subset of the plurality of media elements, and in response to the user input, a second arrangement of a second set of the visual elements is displayed wherein the visual elements in the arrangement are only visual elements that correspond to the subset of media elements to which the selected effect may be applied.

According to an embodiment, a composite media presentation is initially represented by a first arrangement of a first set of visual elements, wherein each visual element in the first set of visual elements corresponds to a media element of a plurality of media elements that together compose the composite media presentation. In this arrangement, at least one visual element at least partially overlaps another visual element. User input is received that causes a subset of the visual elements to be automatically selected and arranged on the display, wherein the automatic selection of the subset of visual elements is based upon which media elements represented by the subset of visual elements are contextually related to an application of the user input. The display is transitioned between the first and second arrangements, which in an embodiment comprises moving the subset of the visual elements from their original positions on the display to another area of the display over a discernable period of time to create an animation effect and causing the visual elements from the first set that are not in the subset to be removed from the display or visually deemphasized, for example by dimming the elements or displaying them in another color. The user input is applied to at least one of the media elements represented by the subset of visual elements, for example applying a text effect to a visual element representing a text media element, or applying a sound effect to a visual representation of an audio media element. The display transitions back to the first arrangement in a similar manner to the first transition, except the subset of visual elements are restored to their original position and the elements not in the subset are restored to the display as they originally appeared. In an embodiment, the order of overlap between the elements changes, while in other embodiments the original order or overlap is restored.

Distributing Composited Elements about the Display

Authoring environments for motion graphics, such as video and animation, generally provide approaches for creating, importing and manipulating various elements. These elements are composited together along a timeline to produce a finished visual display. A current time indicator, such as a playhead, appears on a visual representation of the timeline to indicate the current position in time. Some elements may appear at various points along the timeline; for example, a title comprised of text may appear at a particular point on the display at a first frame (e.g., tenth frame) and disappear from the display at a subsequent frame (e.g., the fortieth frame). Some elements may be arranged in a hierarchical display of layers; for example, the aforementioned text may be on one layer and a video element on which the textual element is overlaid may be on another layer.

FIG. 1 is a block diagram illustrating an authoring interface 102 wherein composited elements in a project are displayed, according to an embodiment. In FIG. 1, a particular frame of a project is displayed. Elements comprising the project that are intended to be displayed at the particular frame are shown and elements that are intended to be displayed at other frames are hidden. The display of the project 104 in FIG. 1 is comprised of numerous elements, such as a first image 106, a second image 108, a video element 110, and two text elements 112, 114.

According to an embodiment, a user may easily select any one of the displayed elements by temporarily rearranging the elements into an expanded display that is not constrained by the boundaries of the project display 104. To initiate the transition into such a viewing mode, a user may activate a control element, such as a particular key on a keyboard, a combination of a key selection and mouse activation, a menu selection, a mouse gesture, or any input element, including voice commands. According to an embodiment, a request to enter the alternate viewing mode might be initiated and controlled by a source other than a user. For example, executable instructions, such as a software application, may communicate the request through an Application Programming Interface (API) call. Also, an operating system or application may initiate the alternate viewing mode in response to a certain condition.

Figure 2:
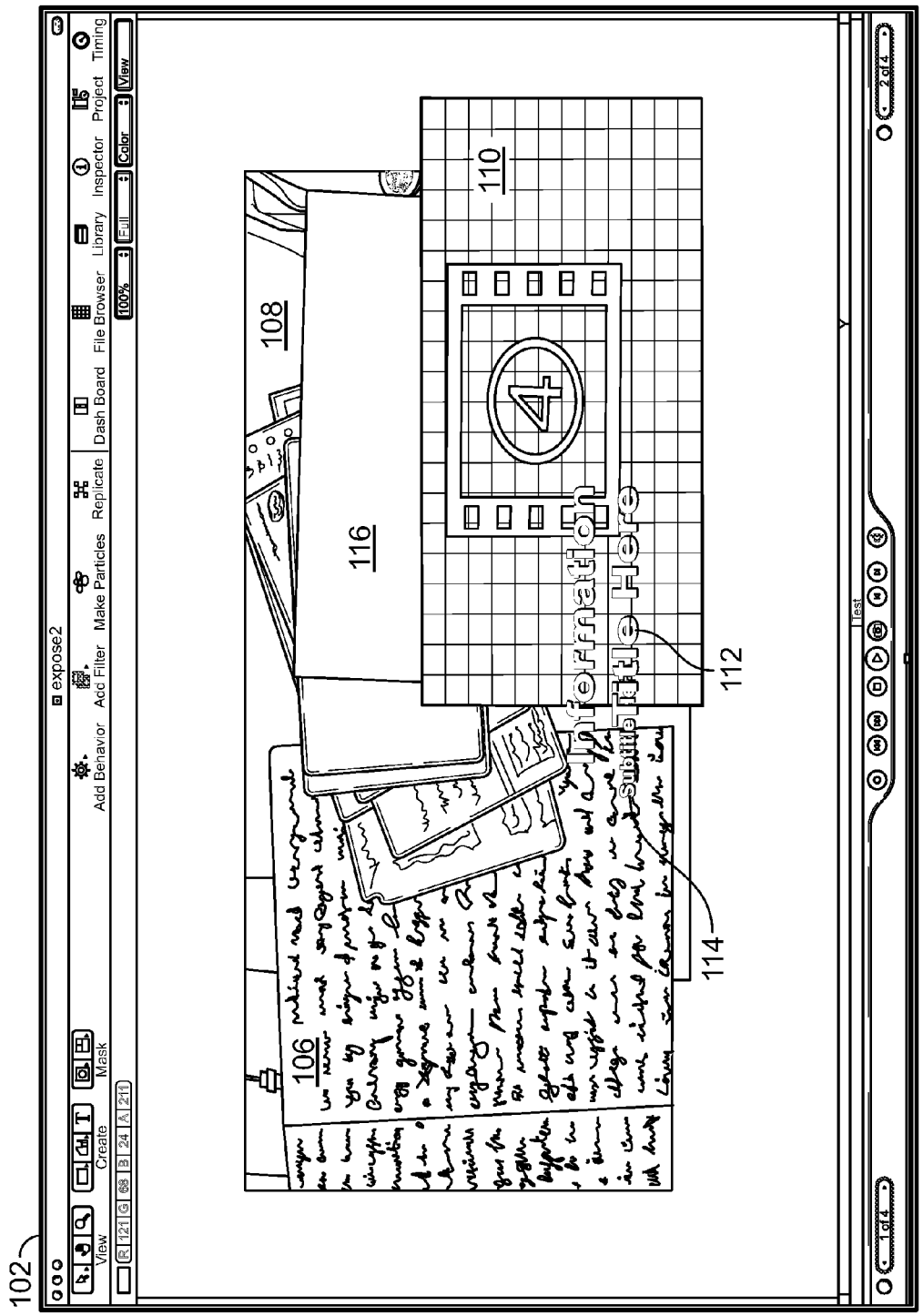
FIG. 2 is a block diagram illustrating an intermediate state of moving to an expanded display, according to an embodiment.
Figure 3:
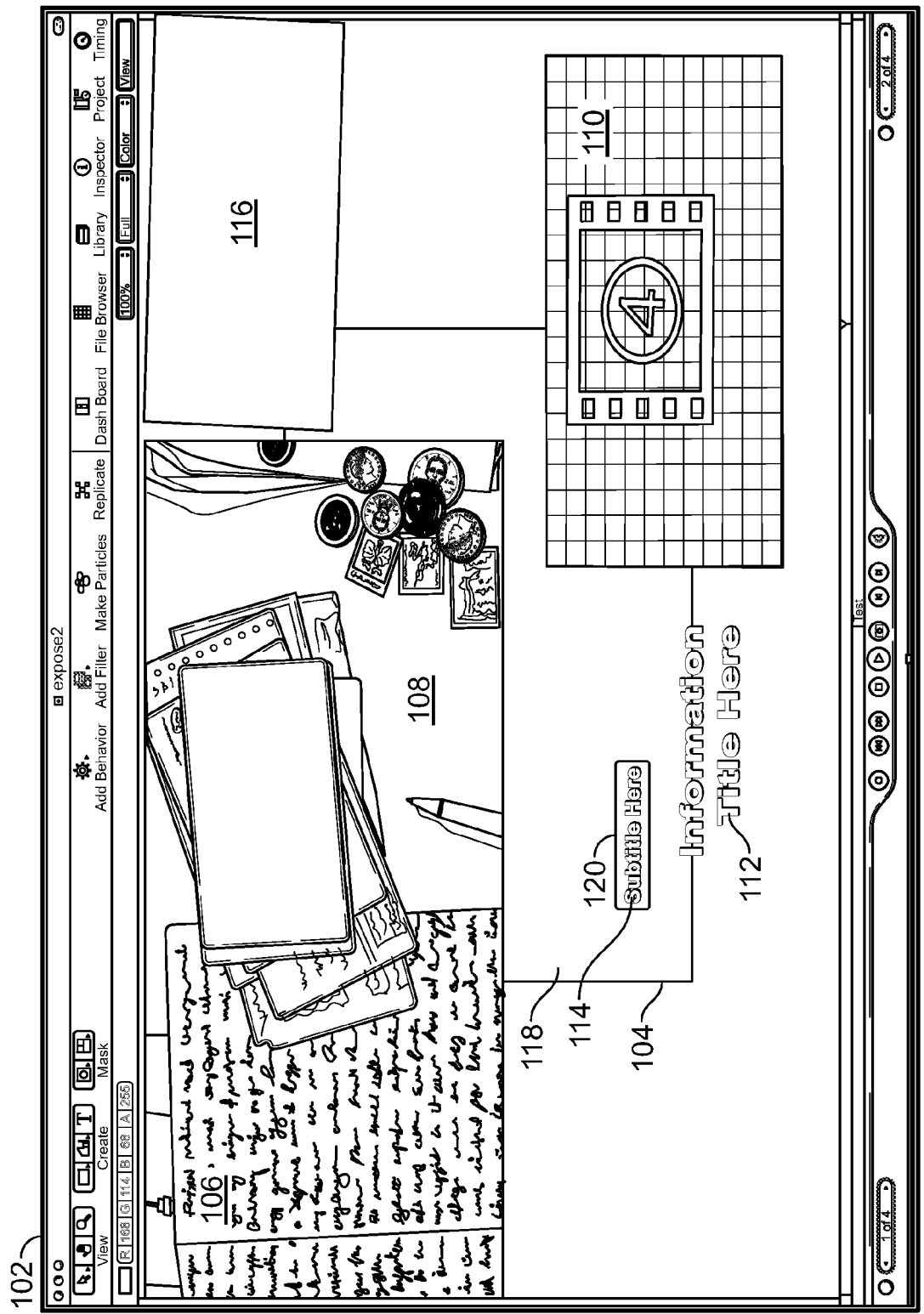
FIG. 3 is a block diagram illustrating an expanded view of composited elements at a particular time in a project, according to an embodiment.

When the expanded display mode is activated, the composited elements are rearranged from the flat, layered display of FIG. 1 to the expanded view of FIG. 3. FIG. 2 is a block diagram illustrating an intermediate state of moving to an expanded display, according to an embodiment. In FIG. 2, the composited elements are moving from the flat, layered display of FIG. 1 to the expanded view of FIG. 3. In FIG. 2, an embodiment is presented wherein the elements 106-114 are moving away from each other, and a mask 116 that was obscured in the view of FIG. 1 is displayed. According to an embodiment, the elements 106-116 may reduce or increase in size if necessary to fit all the elements within the boundaries of the authoring interface 102 and additionally to allow the display of the elements 106-116 without overlap if possible. According to an embodiment, elements may overlap in the expanded display if the alternative is to reduce elements to a size that is below a predetermined threshold. According to an embodiment, the display is darkened or made the color of the display background and/or the visual elements 106-116 brightened to allow greater visibility of the elements 106-116 being viewed in the expanded mode.

FIG. 3 is a block diagram illustrating an expanded view of composited elements at a particular time in a project, according to an embodiment. In FIG. 3, the elements 106-116 have moved away from each other and the elements 106-116 are now displayed without overlap. According to an embodiment, an optimal location of each element is calculated which takes into account various factors such as size of the rearranged element and degree of overlap. While an optimal expanded display comprises all elements maintaining their original size and bring displayed without overlap, when this arrangement is not possible, tradeoffs are determined in accordance with particular factors. In one embodiment, the elements are not reduced in size and the level of overlap is calculated such that a particular arrangement is chosen that provides for the least amount of overlap between elements. In another embodiment, the elements are reduced in size to the extent that a non-overlapping display may be presented. In another embodiment, a combination of the two aforementioned approaches is used to provide an expanded display of the elements. One or more of these embodiments are automatically chosen and may be alternated within the same project. In an embodiment, a user may select a particular display approach; for example, through the use of a menu or preference selection of a modifier key as discussed previously.

In FIG. 3, the expanded display makes apparent that the video element 106 is larger than presented in FIG. 1, and that the video element 106 has been arranged and constrained by the boundary of the project display 118 which in FIG. 3 is displayed in black. In FIG. 3, one of the text titles 114 is being selected, as represented by the selection rectangle 120 around the text title 114. In an embodiment, selection rectangles may always be displayed with elements to clearly delineate the elements' boundaries. A selection state of an element may be indicated with a colored transparent overlay plus a heads-up display containing the element's name when a mouse is moved over it. According to an embodiment, after making a selection such as the one illustrated in FIG. 3, or in response to a user or system input as discussed earlier, the composited elements may return to their original position as illustrated in FIG. 1. In an embodiment, the selected element 114 remains selected and is displayed "on top" of the remaining elements for ease in selection and manipulation. In the example illustrated in FIG. 3, the text title 114 had previously been obscured by the boundary of the other text title 112 and would have been difficult to select without performing additional steps, such as locating the particular element in a linear list after selecting a particular layer in another linear list.

Figure 4:
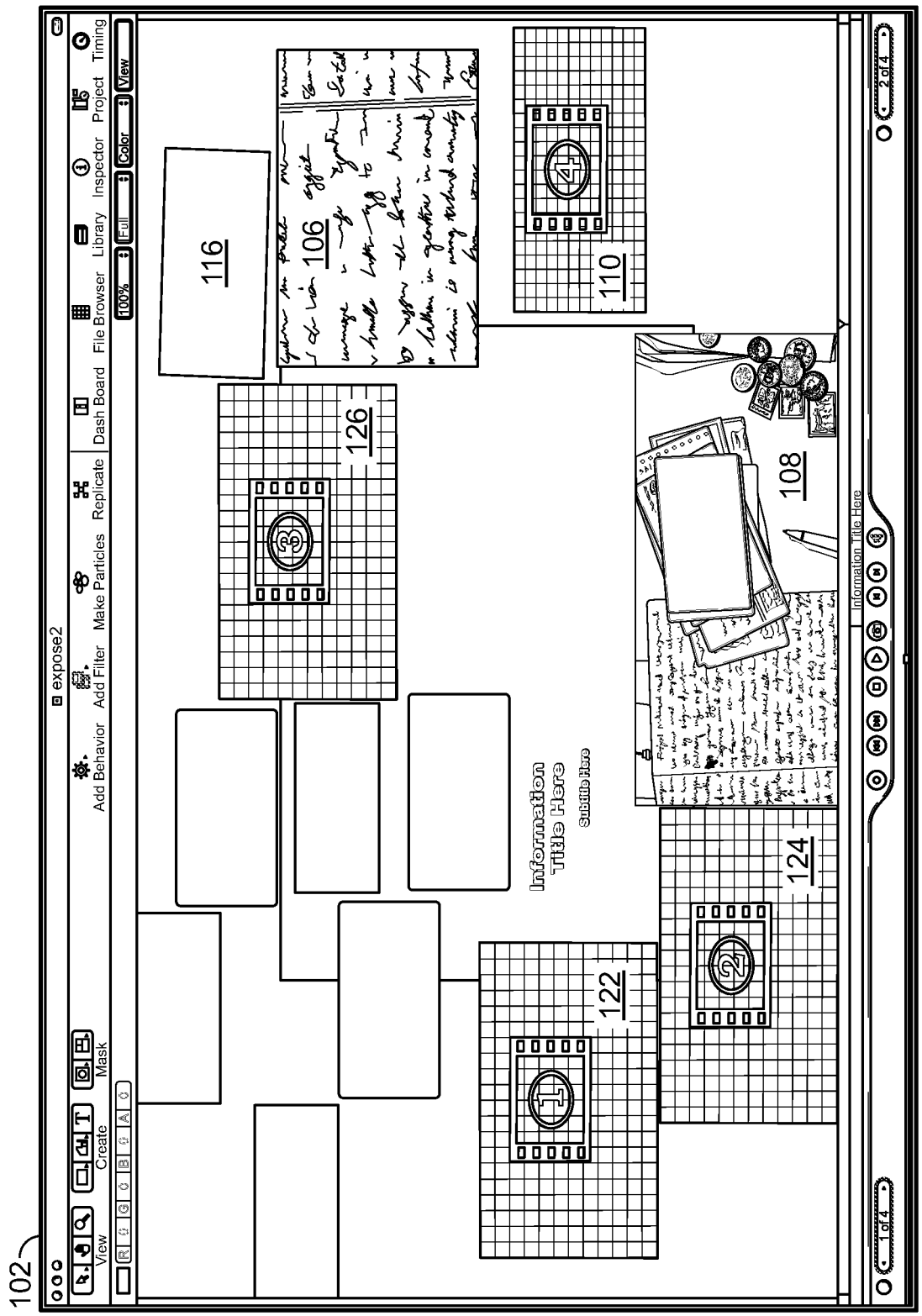
FIG. 4 is a block diagram that illustrates an expanded view of all composited elements in a project, notwithstanding the currently-selected position in the project, according to an embodiment.

FIG. 3 illustrates the expanded display of a subset of elements within a project, which in one embodiment comprises the display of all elements in the project at a particular time. FIG. 4 is a block diagram that illustrates an expanded view of all composited elements in a project, notwithstanding the currently-selected position in the project, according to an embodiment. In FIG. 4, the elements present in the display presented in FIG. 3 are present, as well as all other elements within the project. These additionally displayed elements include, among other items, three additional video elements 122, 124, 126. According to an embodiment, the activation of the display illustrated in FIG. 4 as opposed to the display of a subset of a project's elements illustrated in FIG. 3 may be accomplished through the use of modifier keys, menu selections, or other input as described earlier.

In FIG. 4, one of the video elements 122 is being selected, as represented by the selection rectangle 128 around the video element 122. According to an embodiment, after making a selection such as the one illustrated in FIG. 4, or in response to a user or system input as discussed earlier, the timeline of the project shifts to the first frame at which the selected element 122 appears in the project and the selected element 122 remains selected and is displayed "on top" of the remaining elements for ease in selection and manipulation.

Figure 5:
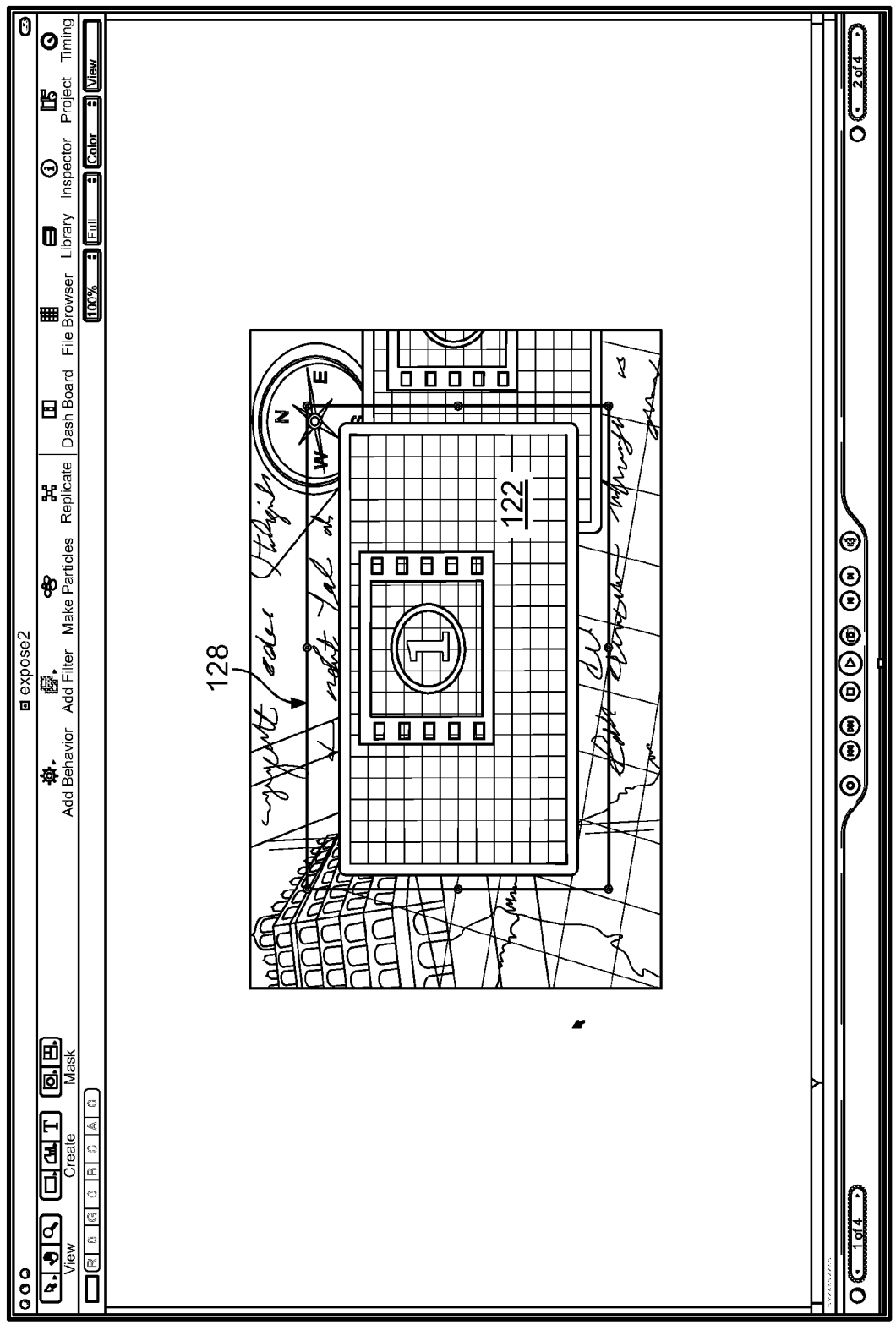
FIG. 5 is a block diagram illustrating the result of selecting a composited element in an expanded display of all elements in a project, according to an embodiment.

FIG. 5 is a block diagram illustrating the result of selecting a composited element in an expanded display of all elements in a project, according to an embodiment. The video element 122 is displayed "on top" of the remaining elements that are present at the first frame at which the video element 122 appears in the project. The video element 122 is selected, as represented by the selection rectangle 128 around the video element 122.

While the approaches described herein allow the display of layers that are "leaf nodes" in a particular hierarchy of elements, for example, the elements are not "parents" of other layers, another embodiment is to display groups. Groups are containers of other elements and/or layers. For example, the top level groups may be displayed in an expanded view as discussed herein, and selecting one of the groups would result in displaying the children of that group is an expanded display, and this approach may be used to drill down through any number of groups.

Once a user finds an element to select, he may select it, for example by clicking on the element with a mouse pointer. This group navigation allows the user to "drill down" into the elements hierarchy level by level instead of seeing all the leaf elements at once with no notion of how they are organized in groups.

Three-Dimensional Display of Composited Elements

Figure 6:
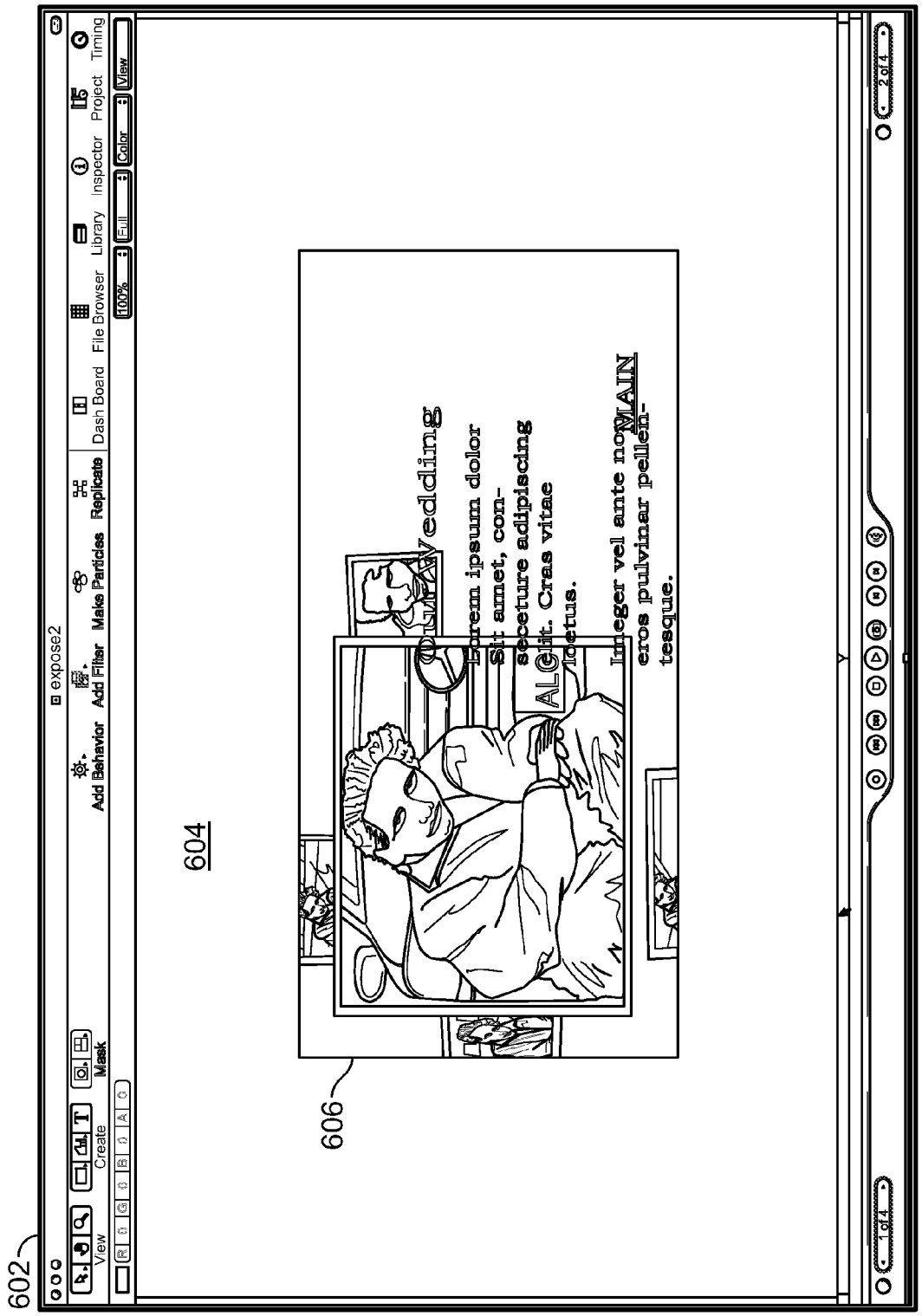
FIG. 6 is a block diagram illustrating the display of particular composited elements at a specific time in a project, according to an embodiment.

FIG. 6 is a block diagram illustrating the display of particular composited elements at a specific time in a project, according to an embodiment. In FIG. 6, the authoring interface 602 provides a virtual canvas on which a project is displayed 604 within a boundary 606. The project is comprised of numerous elements that appear at various points along a timeline and may be adjacent to each other and/or overlapping.

Figure 7:
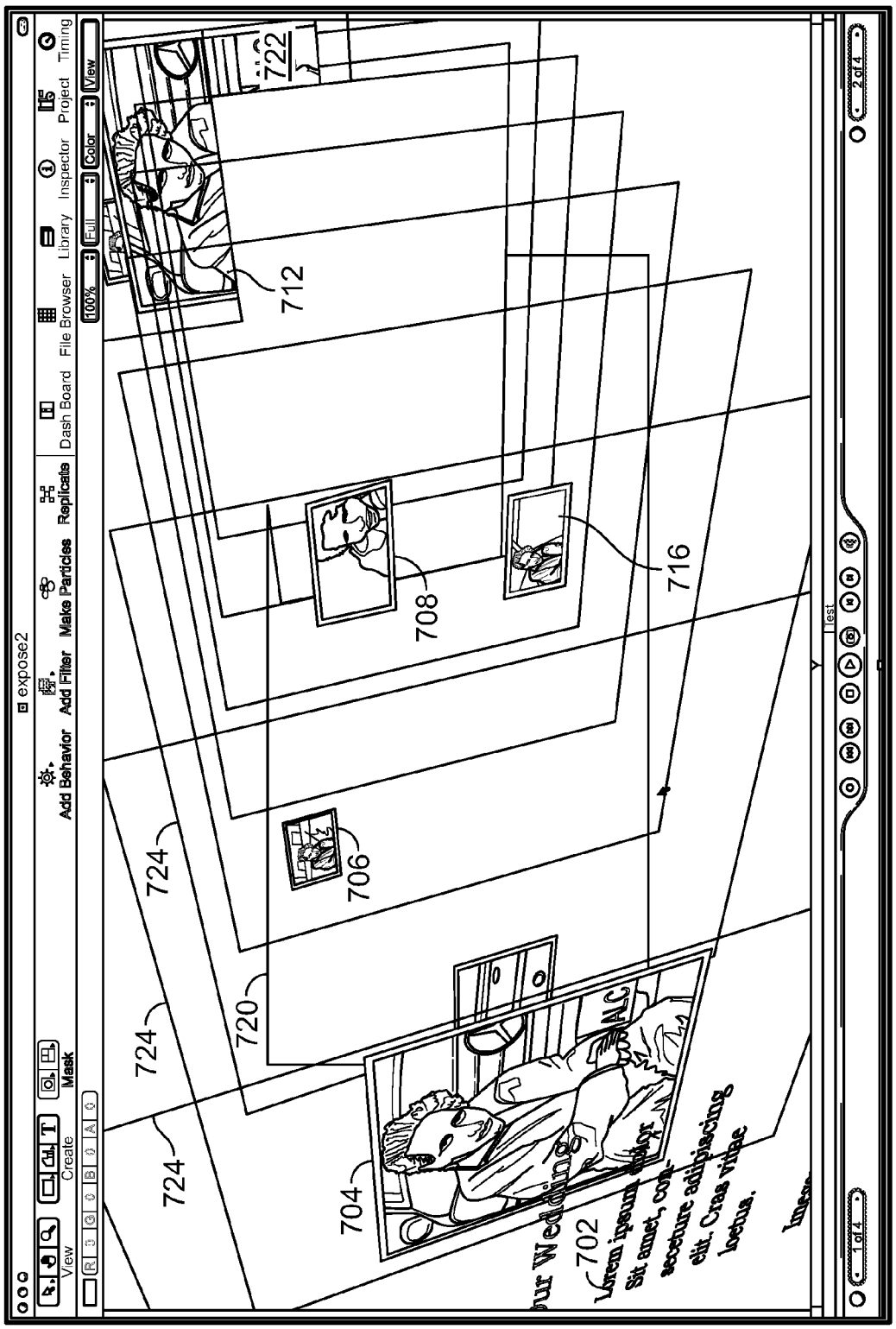
FIG. 7 is a block diagram illustrating a three-dimensional expanded display of the elements making up the project display 604 of FIG. 6, according to an embodiment.

FIG. 7 is a block diagram illustrating a three-dimensional expanded display of the elements making up the project display 604 of FIG. 6, according to an embodiment. According to an embodiment, this expanded display is initiated in response to user and/or system input as described earlier. In an embodiment, the transition from FIG. 6 to FIG. 7 is animated so that a user may visually perceive the shifting of elements and easily determine to where on the display each element has been rearranged, in addition to perceiving the stacking order of each element.

In the embodiment illustrated in FIG. 7, each individual element making up the project display 604 is placed on a separate layer from each other element to represent the stacking order of the elements composited in the two-dimensional display of FIG. 6. For example, the text display 702 is visually separated from the underlying image 704 on which it was superimposed in FIG. 6, and the order of display in the three-dimensional expanded display represents the order in which the respective elements were stacked in the project display of FIG. 6. Also, several image elements 706, 708, 710, 712 that in FIG. 6 were apportioned around the project display 604 are also visually separated from each other and placed on their own layer in the three-dimensional expanded display in accordance with their respective stacking orders.

In the embodiment illustrated in FIG. 7, the project display boundary is represented with a black rectangle 720, and the composited display of the elements at the particular point in the timeline, as illustrated in FIG. 6, is displayed 722 at the back of the expanded three-dimensional display. According to an embodiment, reference rectangles 724 may be displayed to assist a user in visually perceiving the stacking order and location of each individual element comprising the composited display.

Figure 8:
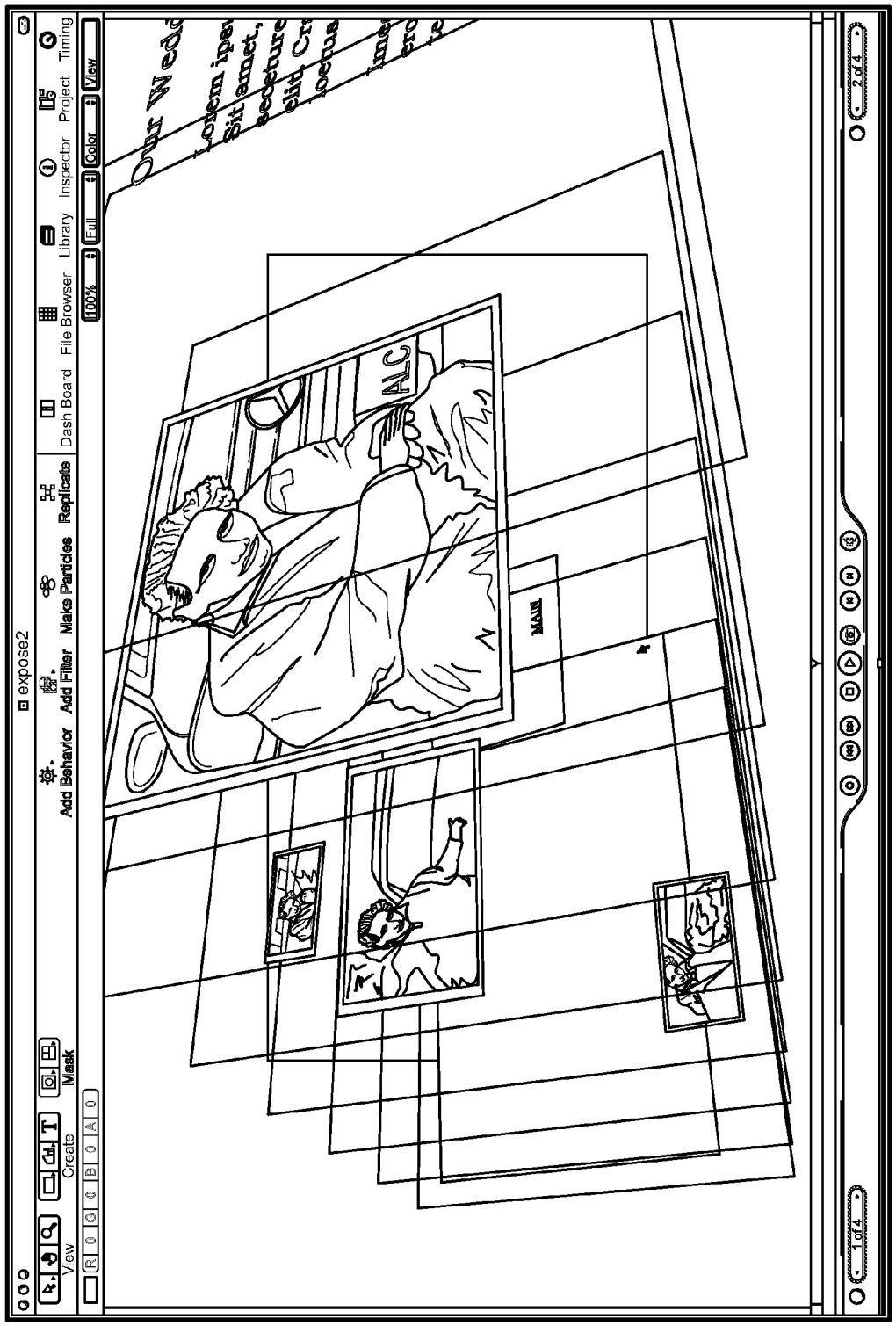
FIG. 8 is a block diagram illustrating an alternate angle of display for a three-dimensional expanded display, according to an embodiment.

FIG. 8 is a block diagram illustrating an alternate angle of display for a three-dimensional expanded display, according to an embodiment. According to an embodiment, a user may rotate the three-dimensional expanded display of FIG. 7 to other angles of display. In an embodiment, this is accomplished through the use of input approaches such as holding down a modifer key while dragging a selected element with a mouse, a menu command, or any other combination of input. In an embodiment, the display animates to follow the changing of the display angle; for example, as the expanded display is rotated from the example illustrated in FIG. 7 to the example illustrated in FIG. 8, the expanded display may flatten as the display progresses through a side view, to a front view, to a side view. In an embodiment, the elements and the reference rectangles 724 move closer together and then further apart to effectuate the animation effect. In an embodiment, the elements may automatically shift locations relative to the reference rectangles to allow for unobstructed viewing; for example, the image 704 may move from being positioned near the bottom of the reference rectangle 724 proximate to the image 704 to the top of the reference rectangle proximate to the image 704.

Manipulation and Modification of Composed Elements

In a project, a user may wish to add and/or modify one or more elements. For example, to apply an effect to text such as bold or a color, to insert an element into a placeholder, associate a behavior with an element, and/or inserting an audio element into a project that may be associated with an element.

Figure 9:
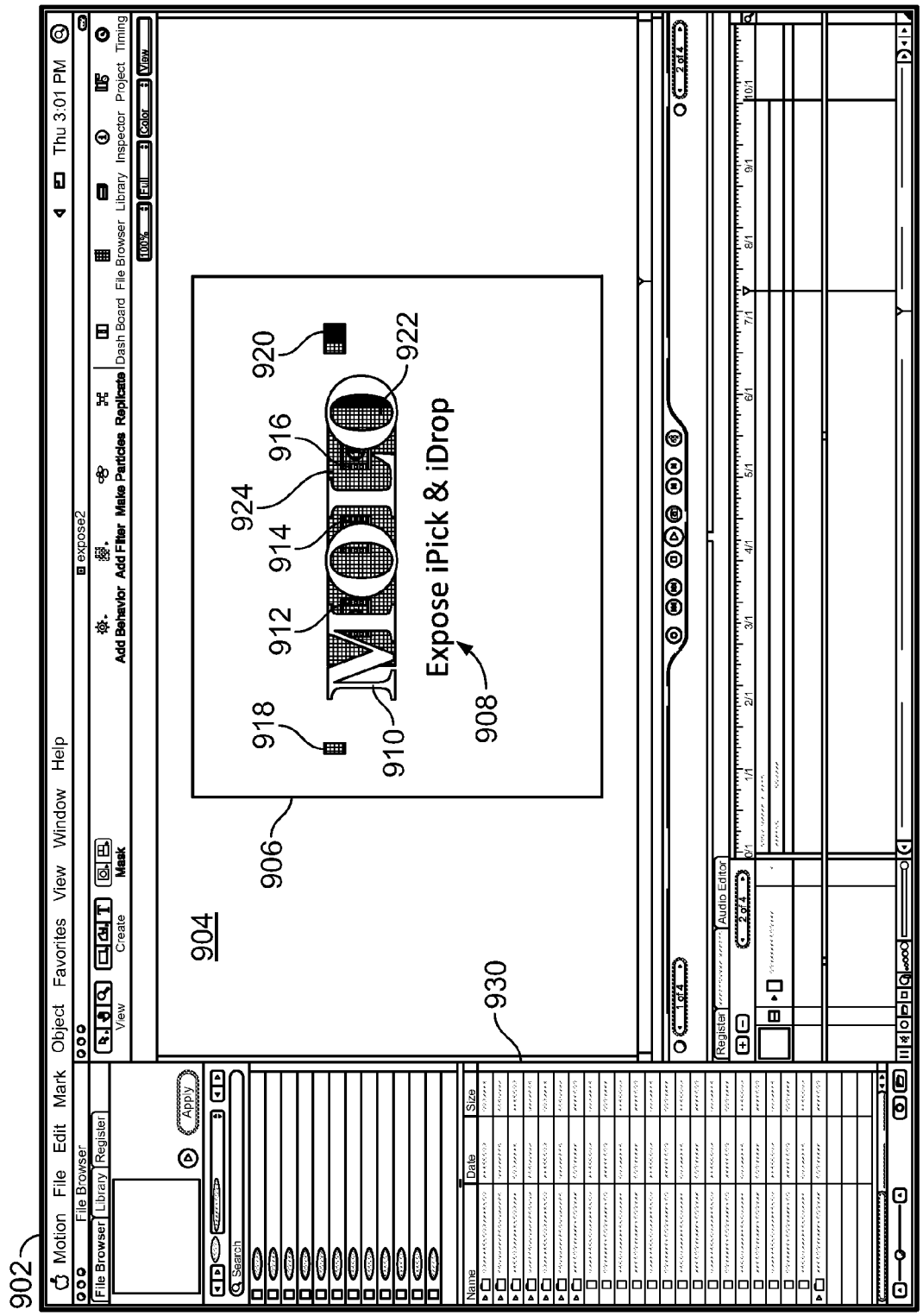
FIG. 9 is a block diagram illustrating an example authoring environment 902 and project 906, according to an embodiment.

FIG. 9 is a block diagram illustrating an example authoring environment 902 and project 906, according to an embodiment. In FIG. 9, the example authoring environment 902 provides a work area 904 in which elements of a project are displayed 906. According to an embodiment, the example project 906 is comprised of elements, the display of which depends on which particular point in the timeline associated with the project 906 is selected. In the example project illustrated in FIG. 9, at the particular point in the timeline displayed, there are several elements composited on the display, some of which overlap. For example, there are two text elements 908, 910, three placeholder elements 912, 914, 916, and numerous graphic elements such as rectangles and squares 918, 920, 922, 924. In the example illustrated in FIG. 9, a text element 910 is overlapping the placeholder elements 912, 914, 916, which are proximate to and overlapping several of the graphic elements 922, 924. In an embodiment, the placeholder elements 912-916 are each a "drop zone" element, which is an element destined to receive a piece of video or an image file that will fit within its boundaries. The "drop zone" may be highlighted in color or otherwise visually altered to indicate that it is a placeholder for video and/or images.

According to an embodiment, a user may select a particular asset, such as a video clip, and place it into the composited display without having to select a layer from a list and then select the element to which the asset is to be associated from a list. According to an embodiment, a user may select an asset, for example by dragging a video clip from a portion of the authoring environment 930, and place the asset in the desired location within the composited display by activating an expanded view of the elements and dropping the asset onto the desired location that is now displayed in its own area of the display.

Figure 10:
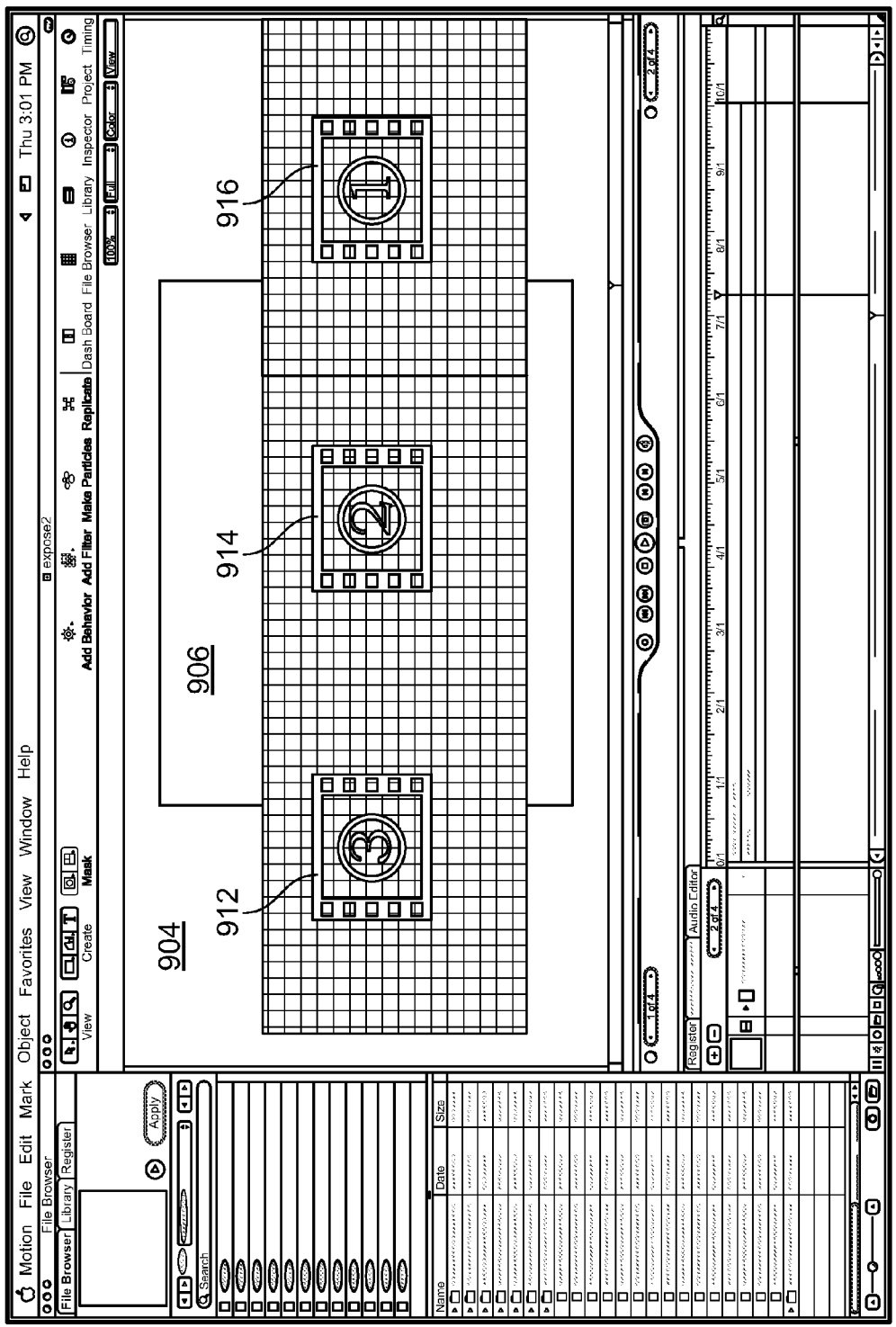
FIG. 10 is a block diagram illustrating the selective expanded display mode and modification of elements, according to an embodiment.

FIG. 10 is a block diagram illustrating the selective expanded display mode and modification of elements, according to an embodiment. In FIG. 10, the three placeholder elements 912, 914, 916 have been separated from the project 906 and expanded to fill the work area 904 in a manner described herein. According to an embodiment, input may be received wherein only certain elements of the composited display may be selected for the expanded view; for example, in response to pressing a modifier key while activating the expanded display mode, only image elements, text elements, and/or audio elements may be displayed. This selected expanded display mode may be customized so that any type of input may activate a mode wherein any selected element or group of elements may be displayed in the expanded mode. For example, a user may create filtering defaults such that when the expanded display mode is activated while depressing the "i" key, only image elements are chosen for the expanded display; or, if the expanded display mode is activated while the "v" key is depressed, only video elements are displayed in expanded mode.

According to an embodiment, the selective filtering of elements in the expanded display may result in displaying only particular elements that are present in the project at the selected point in the project timeline, or may display all particular elements present in the project. In an embodiment, the particular elements selected for the expanded display are contextually chosen; for example, the only elements displayed in the expanded mode are the ones appropriate for a newly selected element destined for inclusion in the project. For example, in FIG. 10, the three placeholder elements 912, 914, 916 are specified to only receive video elements. A video element was selected, for example by dragging a video clip from a portion of the authoring environment 930, and in response to selecting the video clip and activating the expanded view mode, only the elements present in the composite display that can accept video clips were displayed in the expanded mode: in this example, the video placeholder elements 912, 914, 916. Other examples of contextual element display would include only displaying text elements when dragging a text style or font choice from a portion of the authoring environment, and only displaying image elements when dragging an image filter from a portion of the authoring environment. While "dragging and dropping" elements is discussed herein in the context of the selective expanded display mode, it is understood that any type of input capable of selecting an element for inclusion in a project may be used. The automatic filtering of the selective expanded view mode may be customized and additional relationships between selections made in the authoring environment and their respective elements to be displayed may be added.

Figure 11:
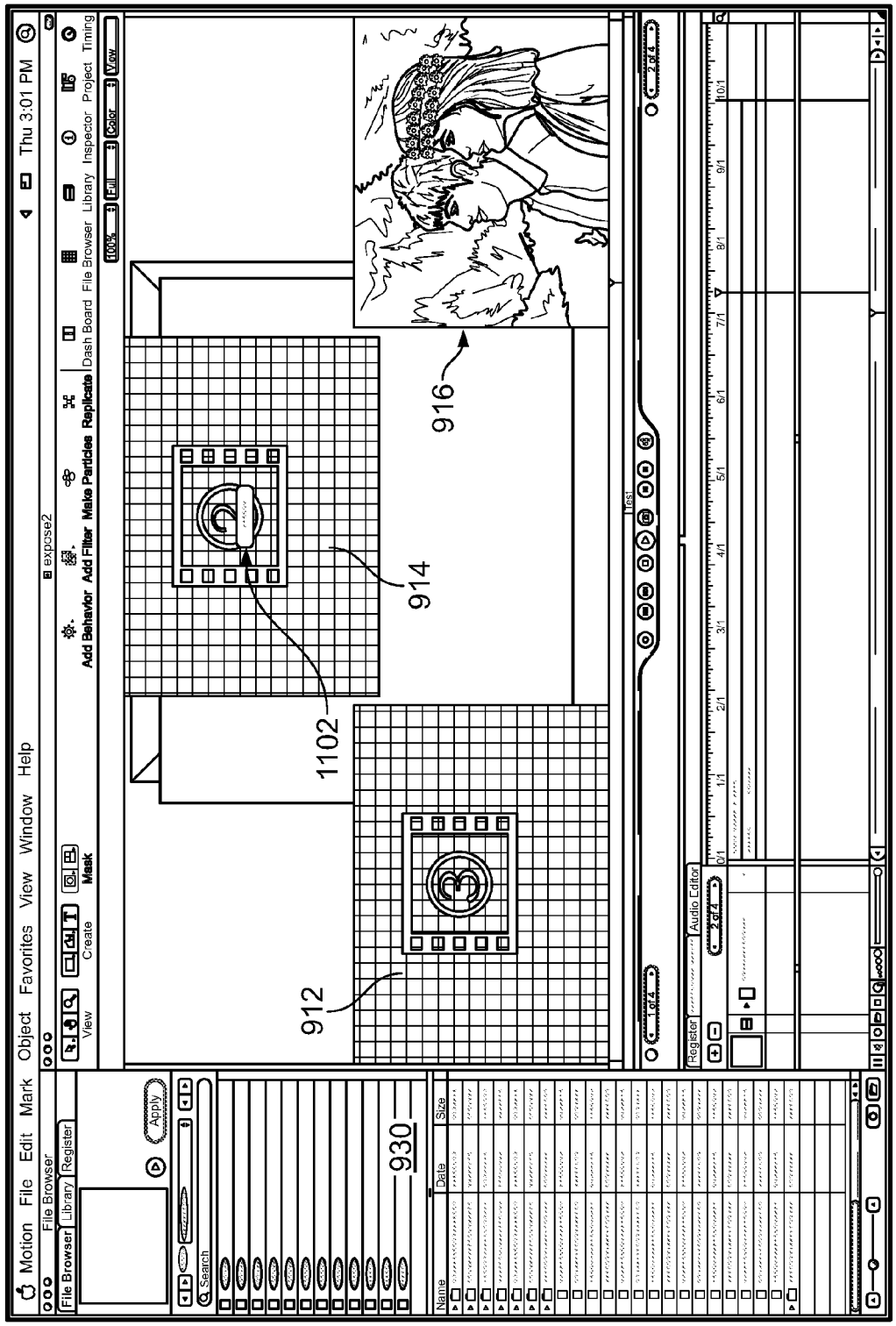
FIG. 11 is a block diagram illustrating the placement of an image element onto a composite display in expanded mode, according to an embodiment.

FIG. 11 is a block diagram illustrating the placement of an image element onto a composite display in expanded mode, according to an embodiment. In FIG. 11, a video element has been dragged and dropped onto one of the placeholder elements 912, 914, 916 presented in FIG. 10, and in response, the expanded display reverted back to the composite display of FIG. 9. As a new video element 1102 is dragged into the work area 904, the placeholder elements 912, 914, 916 are expanded as described earlier. In an embodiment, the first video element dragged and dropped onto one of the video placeholders 916 is displayed by using a frame from the video element to indicate that the particular placeholder element 916 has been associated with a video element.

According to an embodiment, the selective expanded display mode may be automatically activated when importing an element into a project, for example by dragging a video element from a portion of the authoring environment or otherwise selecting an element to be included in the project. In one embodiment, this automatic mode selection may be triggered by depressing a modifier key while dragging an element into the work area 904. In one embodiment, only those elements appropriate for the new element are displayed in the expanded mode, while in other embodiments, only those elements present in the display at a particular point in the project timeline are displayed in expanded mode, or all elements may be displayed in expanded mode. In an embodiment, the expanded mode is triggered when an element is dragged into the work area 904 and deactivated when the element is "dropped" into the work area or dragged off of the work area 904.

Figure 12:
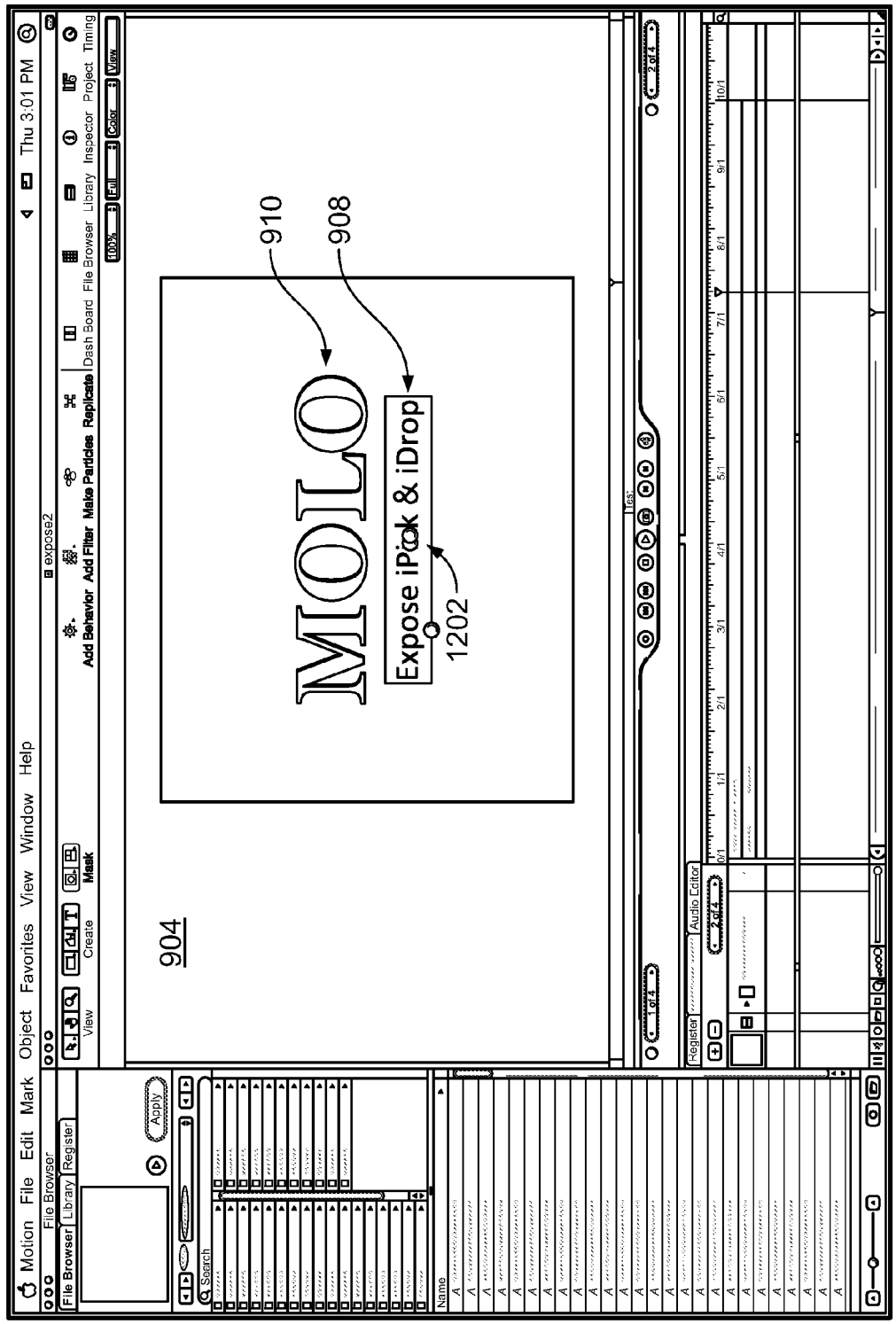
FIG. 12 is a block diagram illustrating the modification of an existing element while in selective expanded display mode, according to an embodiment.

FIG. 12 is a block diagram illustrating the modification of an existing element while in selective expanded display mode, according to an embodiment. In FIG. 12, a text effect 1202 has been dragged into the work area 904 and onto a text element 908. In this example, the text effect may only be applied to text elements, so the selective expanded view mode has been activated wherein only the text elements are displayed. As discussed earlier, this may be accomplished in any number of customizable approaches, such as automatically upon dragging or otherwise selecting a particular element for inclusion in the project or in response to a particular user input, such as holding down a modifier key while activating the expanded view mode. In FIG. 12, the work area 904 has dimmed to enhance the display of the text elements 908, 910.

Figure 13:
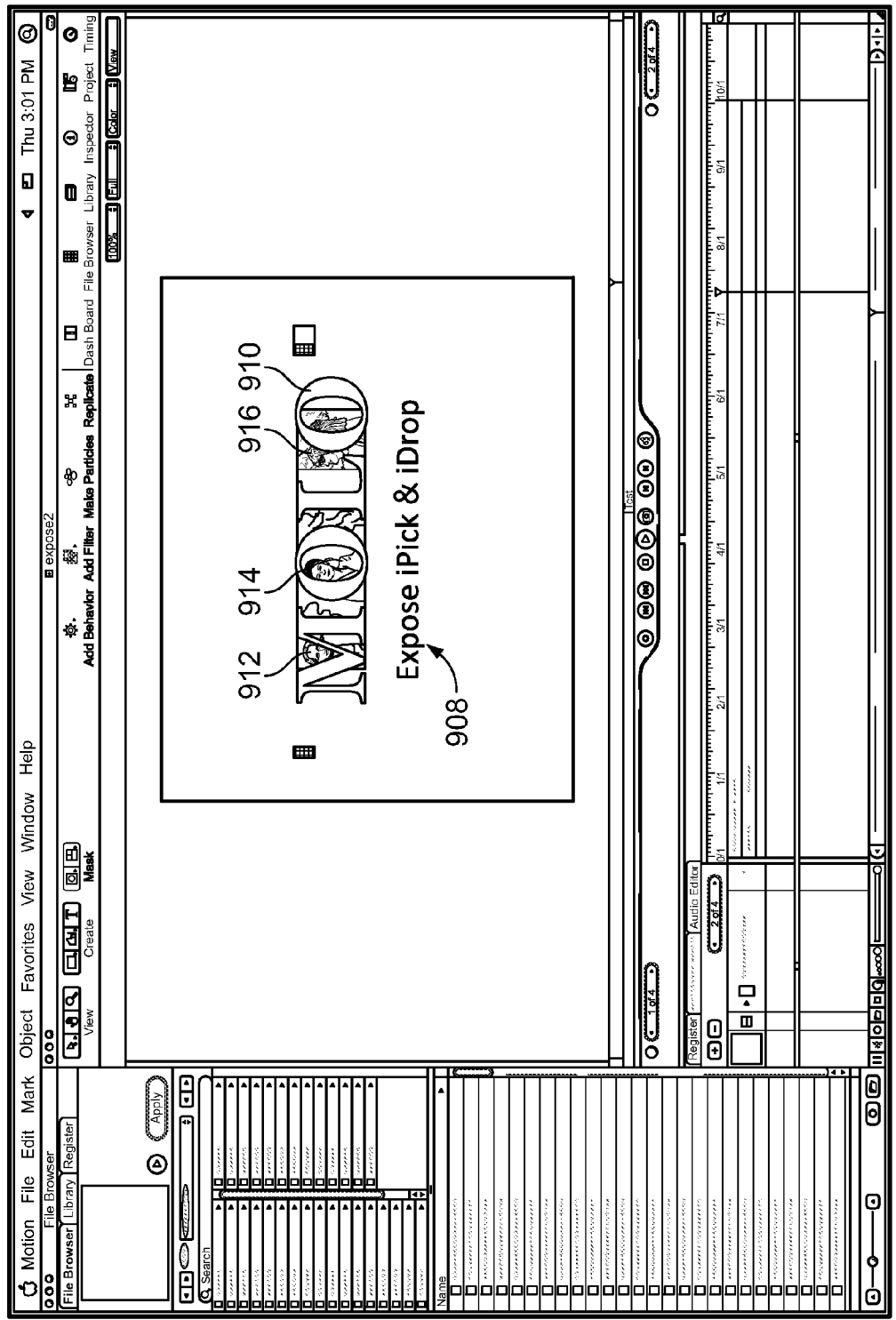
FIG. 13 is a block diagram illustrating the results of modifying elements in a composite display, according to an embodiment.

FIG. 13 is a block diagram illustrating the results of modifying elements in a composite display, according to an embodiment. In FIG. 13, the text element 908 on which a text effect was applied as illustrated in FIG. 12 now appears in bold text. Further, the placeholder elements 912, 914, 916 now display a representative frame of the video content that has been associated with the placeholder elements 912, 914, 916.

Figure 14:
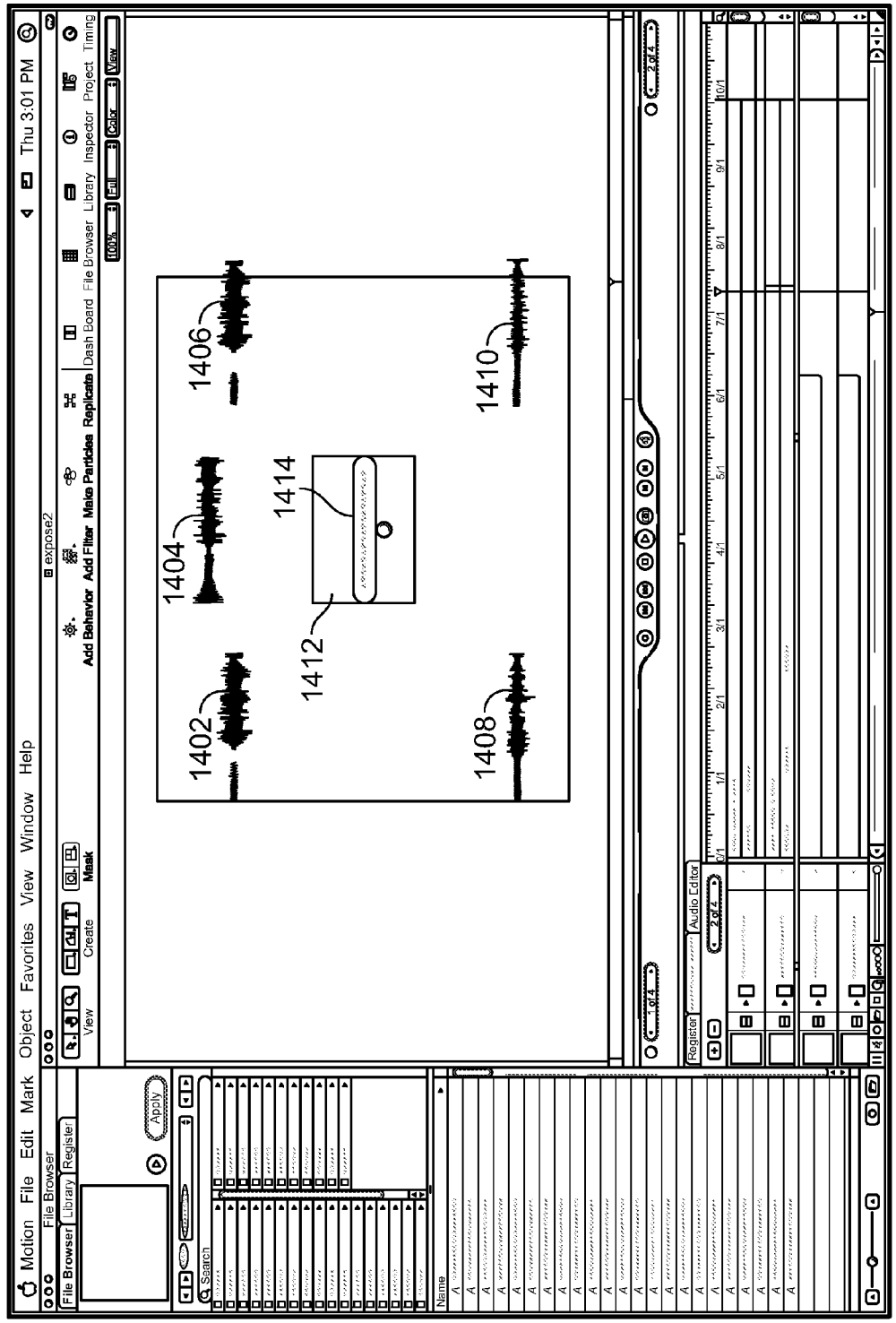
FIG. 14 is a block diagram illustrating the display and modification of a project's audio tracks, according to an embodiment.

Elements of the project that do not normally have a visual display, such as audio tracks, may be displayed, selected, and modified according to an embodiment. FIG. 14 is a block diagram illustrating the display and modification of a project's audio tracks, according to an embodiment. In FIG.

14, the expanded display mode has been activated so that only the audio tracks associated with a project are displayed as graphical elements 1402, 1404, 1406, 1408, 1410, 1412, such as a graphical representation of part or all of the audio element's waveform. In an embodiment, entering the selective expanded display mode wherein only audio elements are displayed is accomplished by holding down a modifier key while activating the expanded display mode, or by another type of input, such as a menu selection or dragging a mouse cursor to a particular portion of the screen. In an embodiment, the selective display of audio tracks in expanded mode may be activated by dragging a file, filter, action, or other modifier, or graphical representation of such items, from the authoring environment that may only be applied to an audio element, such as a "fade in" effect. In FIG. 14, an audio effect 1414 has been dragged into the work area 904 and onto one of the graphical elements representing an audio element 1412. If the audio effect 1414 is associated with the audio element 1412, for example by "dropping" the audio effect 1414 onto the audio element 1412, then in an embodiment the selective expanded display mode will deactivate and the normal project display will appear. In an embodiment, this transition is animated so that a user may visually perceive the changing of modes.

According to an embodiment, in response to selecting one or more of the audio elements in a project, for example by entering the selective expanded display mode wherein one or more audio elements are displayed as graphical elements, moving a cursor over the graphical elements will cause the audio element to begin playing, aiding in identifying the audio element.

An audio behavior may be applied to any element accepting a parameter behavior, such as video elements, shapes and audio tracks. Additional behaviors could be stimuli based on other things, for example physics (e.g. gravity, attraction to another elements, etc.). All behaviors, effects, gradients, fonts, text styles, shapes, and styles can be "dropped" onto objects that accept them. Video footage may only be dropped on other video elements or drop zones, which are placeholders waiting to receive video and/or image elements.

Mono and/or stereo tracks are displayed in the expanded display with no special layout, as they don't have a position in the composition as video and/or image elements do. In an embodiment, surround audio tracks are laid out similarly to physical speakers, the front left/right channels being displayed at the top left and right of the display, the center channel at the top in the middle of the display, the LFE channel (subwoofer) in the center of the display, and the surround left/right channels displayed at the bottom left and right of the display. In an embodiment, stereo tracks may be displayed as left and right speakers if the left and right channels have been imported separately in the composition. If they have been imported as a mix, then they are expanded with no special layout.

Example Embodiment

Figure 15:
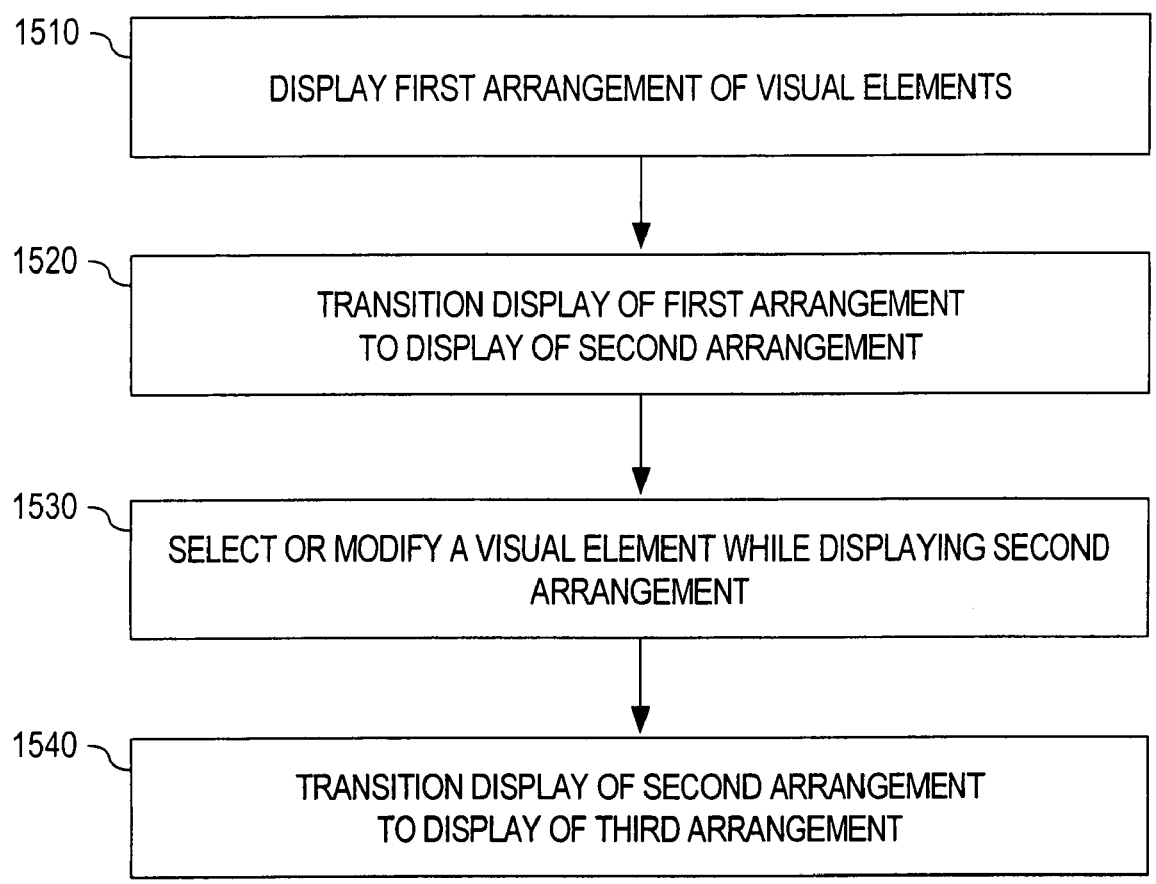
FIG. 15 is a flowchart illustrating the functional steps of visually depicting a composite media presentation that is composed of a plurality of media elements, according to an embodiment of the invention.

FIG. 15 is a flowchart illustrating the functional steps of visually depicting a composite media presentation that is composed of a plurality of media elements, according to an embodiment of the invention. In step 1510, a composite media presentation is initially represented by a first arrangement of visual elements, for example, three overlapping squares of differing color. These visual elements correspond to media elements that make up the composite media presentation. For example, in the composite media presentation, as it is "played," the three squares in the first arrangement may actually be placeholders for video elements that are displayed during actual "playback" of the presentation, or the squares may appear in the presentation just as they appear as visual elements. The visual elements may be an abstract representation of a media element, a visually similar representation, or may be the actual media element.

In step 1520, the display of the first arrangement is transitioned to a display of a second arrangement, in one embodiment in response to user input. This second arrangement is an expanded display mode wherein the visual elements, which may be the visual elements displayed in the first arrangement, all the visual elements in the presentation, of a subset of all the visual elements that may or may not match the visual elements making up the first arrangement, are rearranged on the display from a flat, layered display to an expanded display where the visual elements move away from each other so that the elements either do not overlap or the degree of overlap is reduced. In an embodiment, this transitioning is performed in a manner that visually depicts the transition, such as an animation effect. In an embodiment, the transition may be performed in response to selecting an "effect" that may be applied to one or more of the media elements represented by one or more of the visual elements, or by selecting a media element that is to be associated with a visual element, such as a video clip being "dropped" on a placeholder.

In step 1530, while displaying the visual elements in the expanded display mode, one or more of the visual elements may be selected or otherwise modified. For example, one of the squares may be selected by user input. In another example, an "effect," such as a fade-in audio effect, may be "dropped" or otherwise associated with a media element such as an audio file or component. The "effect" may be a visual representation of the effect that is dragged onto the display and "dropped" on the particular visual element. In an embodiment, only a subset of the visual elements, such as the particular visual elements on which the selected effect may be dropped, are displayed in the expanded display mode.

In step 1540, after a visual element is selected or otherwise modified by having an effect, file, component or other element associated or "dropped" on it, the display is transitioned from the second arrangement to a third arrangement. The third arrangement may be the same as the first arrangement, although in an embodiment, the visual element selected or modified is displayed "in front" of the rest of the visual elements; for example, without being overlapped by any other element.

Implementing Mechanisms

Figure 16:
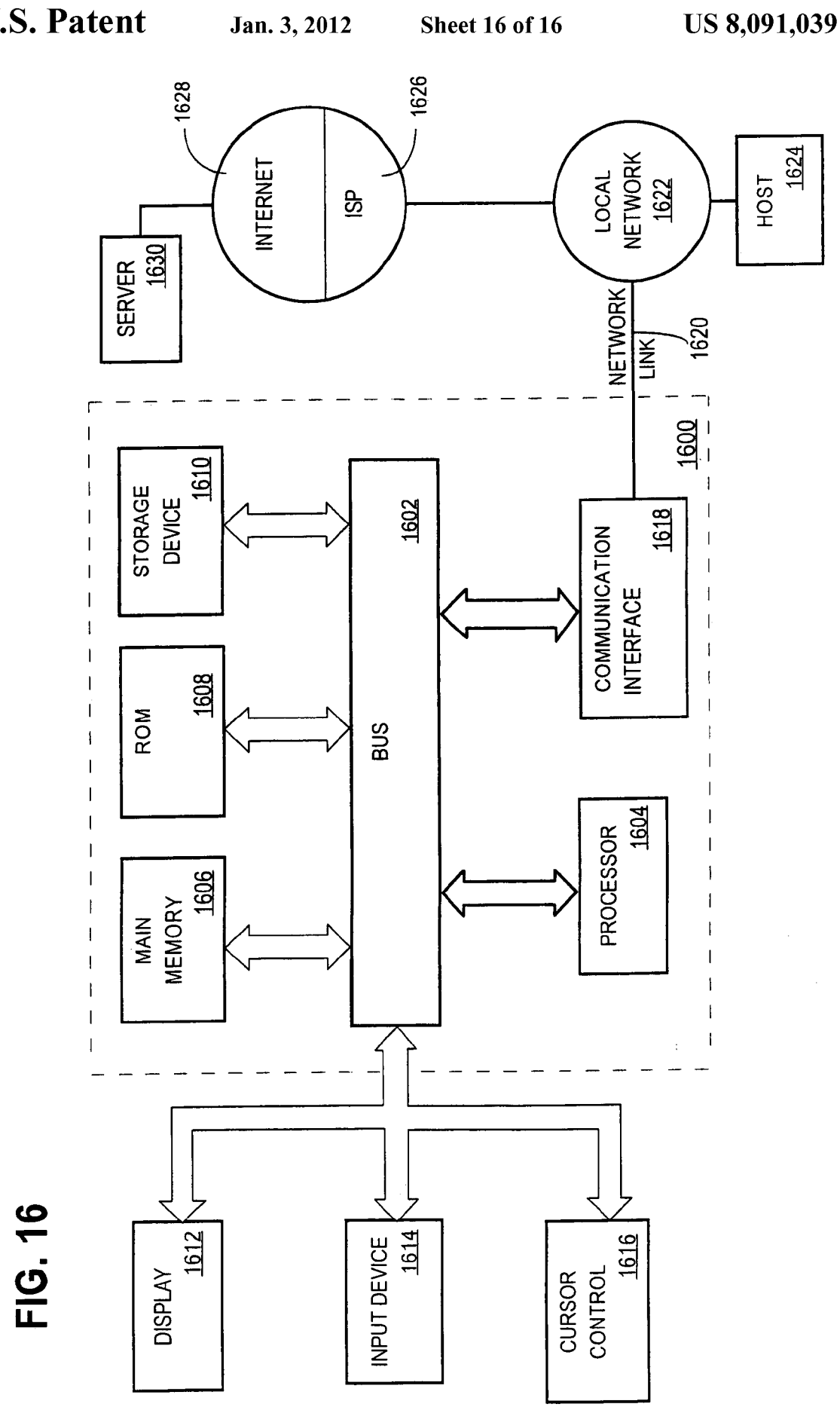
FIG. 16 is a block diagram that illustrates a computer system upon which an embodiment of the invention may be implemented.

FIG. 16 is a block diagram that illustrates a computer system 1600 upon which an embodiment of the invention may be implemented. Computer system 1600 includes a bus 1602 or other communication mechanism for communicating information, and a processor 1604 coupled with bus 1602 for processing information. Computer system 1600 also includes a main memory 1606, such as a random access memory (RAM) or other dynamic storage device, coupled to bus 1602 for storing information and instructions to be executed by processor 1604. Main memory 1606 also may be used for storing temporary variables or other intermediate information during execution of instructions to be executed by processor 1604. Computer system 1600 further includes a read only memory (ROM) 1608 or other static storage device coupled to bus 1602 for storing static information and instructions for processor 1604. A storage device 1610, such as a magnetic disk or optical disk, is provided and coupled to bus 1602 for storing information and instructions.

Computer system 1600 may be coupled via bus 1602 to a display 1612, such as a cathode ray tube (CRT), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane.

The invention is related to the use of computer system 1600 for implementing the techniques described herein. According to one embodiment of the invention, those techniques are performed by computer system 1600 in response to processor 1604 executing one or more sequences of one or more instructions contained in main memory 1606. Such instructions may be read into main memory 1606 from another machine-readable medium, such as storage device 1610. Execution of the sequences of instructions contained in main memory 1606 causes processor 1604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1600, various machine-readable media are involved, for example, in providing instructions to processor 1604 for execution. Such a medium may take many forms, including but not limited to, non-volatile media, volatile media, and transmission media. Non-volatile media includes, for example, optical or magnetic disks, such as storage device 1610. Volatile media includes dynamic memory, such as main memory 1606. Transmission media includes coaxial cables, copper wire and fiber optics, including the wires that comprise bus 1602. Transmission media can also take the form of acoustic or light waves, such as those generated during radio-wave and infrared data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1604 for execution. For example, the instructions may initially be carried on a magnetic disk of a remote computer. The remote computer can load the instructions into its dynamic memory and send the instructions over a telephone line using a modem. A modem local to computer system 1600 can receive the data on the telephone line and use an infra-red transmitter to convert the data to an infra-red signal. An infra-red detector can receive the data carried in the infra-red signal and appropriate circuitry can place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

Computer system 1600 also includes a communication interface 1618 coupled to bus 1602. Communication interface 1618 provides a two-way data communication coupling to a network link 1620 that is connected to a local network 1622. For example, communication interface 1618 may be an integrated services digital network (ISDN) card or a modem to provide a data communication connection to a corresponding type of telephone line. As another example, communication interface 1618 may be a local area network (LAN) card to provide a data communication connection to a compatible LAN. Wireless links may also be implemented. In any such implementation, communication interface 1618 sends and receives electrical, electromagnetic or optical signals that carry digital data streams representing various types of information.

Network link 1620 typically provides data communication through one or more networks to other data devices. For example, network link 1620 may provide a connection through local network 1622 to a host computer 1624 or to data equipment operated by an Internet Service Provider (ISP) 1626. ISP 1626 in turn provides data communication services through the world wide packet data communication network now commonly referred to as the "Internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are exemplary forms of carrier waves transporting the information.

Computer system 1600 can send messages and receive data, including program code, through the network(s), network link 1620 and communication interface 1618. In the Internet example, a server 1630 might transmit a requested code for an application program through Internet 1628, ISP 1626, local network 1622 and communication interface 1618.

The received code may be executed by processor 1604 as it is received, and/or stored in storage device 1610, or other non-volatile storage for later execution. In this manner, computer system 1600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for visually depicting a composite media presentation that is composed of a plurality of media elements, the computer-implemented method comprising:

initially representing the composite media presentation, in an initial arrangement on a display, with a plurality of visual elements, wherein each visual element in the plurality of visual elements corresponds to a media element of the plurality of media elements;
wherein, while in the initial arrangement on the display, each visual element in the plurality of visual elements overlaps with at least one other visual element in the plurality of visual elements;
wherein the plurality of visual elements includes a particular visual element that is at least partially obstructed in the initial arrangement on the display;
in response to receiving input that triggers separation of the plurality of visual elements, automatically separating the plurality of visual elements such that the degree of overlap between each of the plurality of visual elements is reduced, wherein the step of separating comprises moving one or more of the plurality of visual elements;
after separating the plurality of visual elements, receiving selection of the particular visual element, wherein the selection selects the particular visual element;
in response to receiving the selection of the particular visual element, automatically returning the plurality of visual elements back to the initial position in the initial arrangement on the display, wherein the step of returning comprises moving said one or more of the plurality of visual elements, wherein the particular visual element is less obstructed relative to the particular visual element in the initial arrangement on the display;
wherein the method is performed by one or more computing devices.

2. The computer-implemented method of claim 1, wherein separating comprises separating the plurality of visual elements such that none of the plurality of visual elements overlaps another visual element in the plurality of visual elements.

3. The computer-implemented method of claim 1, wherein the composite media representation is also composed of one or more media elements that are not in the plurality of media elements.

4. The computer-implemented method of claim 1, wherein before the input is received, the initial arrangement of the plurality of visual elements on the display comprise a layered composition of the plurality of visual elements.

5. The computer-implemented method of claim 1, wherein the plurality of visual elements comprises all the visual elements corresponding to all media elements in the composite media representation.

6. The computer-implemented method of claim 1, wherein at least one visual element of the plurality of visual elements corresponds to an audio element in the plurality of media elements of the composite media presentation.

7. The computer-implemented method of claim 1, wherein, in response to the selection, said particular visual element is not obstructed by any other visual element in the plurality of visual elements.

8. The computer-implemented method of claim 1, wherein separating comprises moving the plurality of visual elements from their original positions in the initial arrangement on the display to a particular area of the display over a discernable period of time to create an animation effect.

9. The computer-implemented method of claim 1, wherein the particular visual element comprises an image extracted from the media element that corresponds to the particular visual element.

10. The computer-implemented method of claim 1, wherein the display of the plurality of visual elements after the plurality of visual elements are separated and before the selection is received comprises a three-dimensional display of visual elements.

11. The computer-implemented method of claim 10, further comprising rotating the three-dimensional display of the plurality of visual elements without adding or removing visual elements.

12. The computer-implemented method of claim 10, wherein the three-dimensional display comprises the plurality of visual elements and reference elements which visually assist a user in perceiving a stacking order of the plurality of visual elements.

13. The computer-implemented method of claim 1, further comprising:
determining a current position of a current time indicator on a timeline;
based on the current position, identifying the plurality of media elements of the composite media presentation;
wherein the plurality of media elements comprises those media elements that would be displayed in the composite media presentation during the time that is indicated by the current time indicator;
wherein the plurality of media elements comprise less than all the media elements of which the composite media presentation is composed.

14. The computer-implemented method of claim 13, wherein receiving the selection of the particular visual element results in setting the current time indicator to a particular point in the timeline where the particular media element represented by the particular visual element is to be first displayed in the composite media presentation.

15. The computer-implemented method of claim 1, wherein at least one particular media element of the plurality of media elements comprises only audio, and wherein the plurality of visual elements includes a visual element depicting the signal of the audio media element.

16. A computer-implemented method for visually depicting a composite media presentation that is composed of a plurality of media elements, the computer-implemented method comprising:
initially representing the composite media presentation with a plurality of visual elements, wherein each visual element in the plurality of visual elements corresponds to a media element of the plurality of media elements;
receiving input that selects an item that is associated with a first type of media element, wherein two or more media elements of said plurality of media elements are of the first type, wherein one or more media elements of the plurality of media elements are of a second type that is different than the first type;
in response to receiving the input:
identifying, of the plurality of visual elements, the visual elements that correspond to media elements that are of the first type, and
causing, without dragging any of the visual elements that correspond to the media elements that are of the first type, a visual change to one of
the visual elements that correspond to media elements of the first type or
visual elements in the plurality of visual elements that correspond to media elements of the first of the second type,
without causing the visual change to the other of the visual elements that correspond to media elements of the first type or the visual elements that correspond to media elements that are of the second type;
wherein the method is performed by one or more computing devices.

17. The computer-implemented method of claim 16, wherein the item is a media element for inclusion in the composite media presentation.

18. The computer-implemented method of claim 16, wherein the input comprises dragging a visual representation of the item into a particular area of a display.

19. The computer-implemented method of claim 16, wherein causing comprises moving the visual elements that correspond to media elements of the first type such that none of the visual elements in the plurality of visual elements overlap any visual element that corresponds to a media element of the first type.

20. The computer-implemented method of claim 16, wherein causing comprises moving the visual elements that correspond to media elements of the first type from their original positions on a display to a particular area of the display over a discernable period of time to create an animation effect.

21. The computer-implemented method of claim 16, wherein causing comprises causing the visual elements in the plurality of visual elements that correspond to media elements that are not of the first type to be removed from a display.

22. The computer-implemented method of claim 21, wherein causing comprises causing the visual elements in the plurality of visual elements that correspond to media elements that are not of the first type to be removed from a display.

23. The computer-implemented method of claim 21, wherein the item corresponds to an effect that can only be applied to media elements of the first type.

24. The computer-implemented method of claim 16, wherein the first type is one of audio, video, image, or text, wherein the second type is one of audio, video, image, or text.

25. A machine-readable storage for visually depicting a composite media presentation that is composed of a plurality of media elements, the machine-readable storage storing instructions which, when executed by one or more processors, cause:
  initially representing the composite media presentation, in an initial arrangement on a display, with a plurality of visual elements, wherein each visual element in the plurality of visual elements corresponds to a media element of the plurality of media elements;
  wherein, while in the initial arrangement on the display, each visual element in the plurality of visual elements overlaps with at least one other visual element in the plurality of visual elements;
  wherein the plurality of visual elements includes a particular visual element that is at least partially obstructed in the initial arrangement on the display;
  in response to receiving input that triggers separation of the plurality of visual elements, automatically separating the plurality of visual elements such that the degree of overlap between each of the plurality of visual elements is reduced, wherein the step of separating comprises moving one or more of the plurality of visual elements;
  after separating the plurality of visual elements, receiving selection of the particular visual element, wherein the selection selects the particular visual element;
  in response to receiving the selection of the particular visual element, automatically returning the plurality of visual elements back to the initial position in the initial arrangement on the display, wherein the step of returning comprises moving said one or more of the plurality of visual elements, wherein the particular visual element is less obstructed relative to the particular visual element in the initial arrangement on the display.

26. The machine-readable storage of claim 25, wherein separating comprises separating the plurality of visual elements such that none of the plurality of visual elements overlaps another visual element in the plurality of visual elements.

27. The machine-readable storage of claim 25, wherein the composite media representation is also composed of one or more media elements that are not in the plurality of media elements.

28. The machine-readable storage of claim 25, wherein before the input is received, the initial arrangement of the plurality of visual elements on the display comprise a layered composition of the plurality of visual elements.

29. The machine-readable storage of claim 25, wherein the plurality of visual elements comprises all the visual elements corresponding to all media elements in the composite media representation.

30. The machine-readable storage of claim 25, wherein at least one visual element of the plurality of visual elements corresponds to an audio element in the plurality of media elements of the composite media presentation.

31. The machine-readable storage of claim 25, wherein, in response to the selection, said particular visual element is not obstructed by any other visual element in the plurality of visual elements.

32. The machine-readable storage of claim 25, wherein separating comprises moving the plurality of visual elements from their original positions in the initial arrangement on the display to a particular area of the display over a discernable period of time to create an animation effect.

33. The machine-readable storage of claim 25, wherein the particular visual element comprises an image extracted from the media element that corresponds to the particular visual element.

34. The machine-readable storage of claim 25, wherein the display of the plurality of visual elements after the plurality of visual elements are separated and before the selection is received comprises a three-dimensional display of visual elements.

35. The machine-readable storage of claim 34, wherein the instructions, when executed by the one or more processors, further cause rotating the three-dimensional display of the plurality of visual elements without adding or removing visual elements.

36. The machine-readable storage of claim 34, wherein the three-dimensional display comprises the plurality of visual elements and reference elements which visually assist a user in perceiving a stacking order of the plurality of visual elements.

37. The machine-readable storage of claim 25, wherein the instructions, when executed by the one or more processors, further cause:
  determining a current position of a current time indicator on a timeline;
  based on the current position, identifying the plurality of media elements of the composite media presentation;
  wherein the plurality of media elements comprises those media elements that would be displayed in the composite media presentation during the time that is indicated by the current time indicator;
  wherein the plurality of media elements comprise less than all the media elements of which the composite media presentation is composed.

38. The machine-readable storage of claim 37, wherein receiving the selection of the particular visual element results in setting the current time indicator to a particular point in the timeline where the particular media element represented by the particular visual element is to be first displayed in the composite media presentation.

39. The machine-readable storage of claim 25, wherein at least one particular media element of the plurality of media elements comprises only audio, and wherein the plurality of visual elements includes a visual element depicting the signal of the audio media element.

40. A machine-readable storage for visually depicting a composite media presentation that is composed of a plurality of media elements, the machine-readable storage storing instructions which, when executed by one or more processors, cause:

initially representing the composite media presentation with a plurality of visual elements, wherein each visual element in the plurality of visual elements corresponds to a media element of the plurality of media elements;

receiving input that selects an item that is associated with a first type of media element, wherein two or more media elements of said plurality of media elements are of the first type, wherein one or more media elements of the plurality of media elements are of a second type that is different than the first type;

in response to receiving the input:

identifying, of the plurality of visual elements, the visual elements that correspond to media elements that are of the first type, and causing, without dragging any of the visual elements that correspond to the media elements that are of the first type, a visual change to one of the visual elements that correspond to media elements of the first type or visual elements in the plurality of visual elements that correspond to media elements of the first of the second type, without causing the visual change to the other of the visual elements that correspond to media elements of the first type or the visual elements that correspond to media elements that are of the second type.

41. The machine-readable storage of claim 40, wherein the item is a media element for inclusion in the composite media presentation.

42. The machine-readable storage of claim 40, wherein the input comprises dragging a visual representation of the item into a particular area of a display.

43. The machine-readable storage of claim 40, wherein causing comprises moving the visual elements that correspond to media elements of the first type such that none of the visual elements in the plurality of visual elements overlap any visual element that corresponds to a media element of the first type.

44. The machine-readable storage of claim 40, wherein causing comprises moving the visual elements that correspond to media elements of the first type from their original positions on a display to a particular area of the display over a discernable period of time to create an animation effect.

45. The machine-readable storage of claim 40, wherein causing comprises causing the visual elements in the plurality of visual elements that correspond to media elements that are not of the first type to be removed from a display.

46. The machine-readable storage of claim 45, wherein causing comprises causing the visual elements in the plurality of visual elements that correspond to media elements that are not of the first type to be removed from a display.

47. The machine-readable storage of claim 45, wherein the item corresponds to an effect that can only be applied to media elements of the first type.

48. The machine-readable storage of claim 40, wherein the first type is one of audio, video, image, or text, wherein the second type is one of audio, video, image, or text.

* * * * *